(12) United States Patent
Poola et al.

(10) Patent No.: US 6,173,567 B1
(45) Date of Patent: Jan. 16, 2001

(54) METHOD TO REDUCE DIESEL ENGINE EXHAUST EMISSIONS

(75) Inventors: Ramesh B. Poola; Ramanujam R. Sekar, both of Naperville, IL (US)

(73) Assignee: The University of Chicago, Chicago, IL (US)

( * ) Notice: Under 35 U.S.C. 154(b), the term of this patent shall be extended for 0 days.

(21) Appl. No.: 09/152,578

(22) Filed: Sep. 14, 1998

(51) Int. Cl.$^7$ ........................................................ F01N 3/00
(52) U.S. Cl. ................... 60/274; 60/280; 60/285; 123/26; 123/585
(58) Field of Search ............................ 60/274, 282, 280, 60/278, 285, 289, 304; 123/26, 585

(56) References Cited

U.S. PATENT DOCUMENTS

| | | | |
|---|---|---|---|
| 3,814,065 | * 6/1974 | Gospodar | 123/26 |
| 3,851,632 | * 12/1974 | Teshirogi et al. | 123/119 A |
| 4,192,262 | * 3/1980 | Ohoda et al. | 123/75 B |
| 5,051,113 | 9/1991 | Nemser . | |
| 5,051,114 | 9/1991 | Nemser et al. . | |
| 5,526,641 | 6/1996 | Sekar et al. | 60/274 |
| 5,636,619 | 6/1997 | Poola et al. | 123/585 |
| 5,640,845 | 6/1997 | Ng et al. | 60/274 |
| 5,649,517 | 7/1997 | Poola et al. | 123/585 |
| 5,709,196 | * 1/1998 | Coleman et al. | 123/672 |
| 5,832,725 | * 11/1998 | Sim | 60/289 |

OTHER PUBLICATIONS

*Automotive Engineering*, "Natural gas fueling of diesel engines", Nov. 1996, pp. 87–90.

* cited by examiner

*Primary Examiner*—Thomas Denion
*Assistant Examiner*—Binh Tran
(74) *Attorney, Agent, or Firm*—Mason, Kolehmainen, Rathburn & Wyss

(57) ABSTRACT

A combustion air management and emission control system injects supplemental air directly into combustion chambers of a diesel engine in order to reduce total particulates in exhaust gases being emitted from the engine. A portion of intake air flowing toward an intake manifold of the engine is diverted to a compressor so that controlled quantities of pressurized supplemental air can be injected directly into each of the combustion chambers while the piston within the combustion chamber is in its expansion and/or exhaust strokes. At least a portion of the diverted intake air can be directed through a selectively permeable membrane device so that oxygen-enriched air and nitrogen-enriched air are produced. At least a portion of the oxygen-enriched air can be supplied to the compressor so that the supplemental air being injected into the combustion chambers will contain a desired, elevated amount of oxygen. In order to simultaneously reduce $NO_x$ from the exhaust gases of the engine, the nitrogen-enriched air can be mixed with intake air being supplied to the intake of the engine or can be introduced into a plasma device to generate monatomic nitrogen that is injected in the exhaust gases to react with $NO_x$ in the exhaust gases. Additionally, an exhaust gas recirculation system can be provided to recirculate a portion of the exhaust gases into the intake of the engine, fuel injection timing can be retarded to delay the beginning of combustion in the combustion chambers or rate shaping of the fuel delivery can be used.

15 Claims, 3 Drawing Sheets

METHOD TO REDUCE DIESEL ENGINE EXHAUST EMISSIONS

CONTRACTUAL ORIGIN OF THE INVENTION

The United States Government has rights in this invention pursuant to Contract No. W-31-109-ENG-38 between the United States and The University of Chicago.

BACKGROUND OF THE INVENTION

1. Field of the Invention

This invention relates to a method and apparatus for reducing undesirable emissions in the exhaust of a compression ignition (diesel) engine, and more particularly, to a new and improved method and apparatus for reducing the amount of total particulates in the exhaust of the diesel engine by injecting controlled quantities of supplemental air (that may include oxygen-enriched air) directly into combustion chambers of the engine during the portion of the combustion cycle of the engine when the piston in each such combustion chamber is in its expansion and/or exhaust strokes.

2. Background of the Invention

Compression ignition (diesel) engines typically have high exhaust emissions, such as particulates (for example, carbon soot and volatile organic compounds), visible smoke, and oxides of nitrogen ($NO_X$). The United States Environmental Protection Agency (EPA) emissions standards for future automobiles, trucks and locomotive diesel engines require simultaneous reduction of $NO_X$ and total particulate emissions to very low levels. This tends to be difficult to achieve because of the inherent tradeoffs between lowering both total particulates and $NO_X$ emissions from a diesel engine while maintaining the engine's overall fuel economy and the engine's cost efficiency. Consequently, the reduction of total particulate emissions while still meeting $NO_X$ emission standards has been an ongoing problem. In order to overcome this ongoing problem, various different methods have been tried to reduce particulate emissions. These methods include high pressure fuel injection, multiple staged injection, oxygenated diesel fuels, oxidation catalysts, and particulate traps. While it is possible in a diesel engine to reduce total particulate emissions and to improve power density performance by using oxygen-enriched intake air, such oxygen-enriched intake air tends to also increase the amount of $NO_X$ in the exhaust being emitted from the diesel engine.

In the case of both diesel and spark ignition engines, exhaust gas recirculation (EGR) systems have been used as one method of decreasing $NO_X$ emissions. When the gases from the EGR system are about 50% of the intake air, oxygen concentration is decreased from about 21% to about 14%. The decrease of $NO_X$ by the use of EGR systems tends to vary depending on the rate, temperature and water content of the EGR gases, injection timing, and air-fuel ratio of the intake to the engine. However, there are limits as to the amount of exhaust gases that can be reintroduced into the engine before power output and fuel economy are adversely affected. Such reintroduction of exhaust gases can also cause an increase in particulates in exhaust gases being emitted from the engine because the recirculated gases include soot particles.

Other attempts have been made to control the amount of $NO_X$ being emitted from the exhaust of an engine. One such method involves the retarding of the fuel injection timing, but such retarding of the injection of fuel tends to increase the amount of particulate emissions and also tends to increase fuel consumption. Another method that has been developed to control the amount of $NO_X$ generated by the engine involves controlling the amount of oxygen and nitrogen included in the intake air of the engine (see, for example, U.S. Pat. No. 5,649,517 that is assigned to the same assignee of record as the present application). On the other hand, attempts have been made to lower the level of $NO_X$ in such exhaust gases or emissions of an engine by injecting into the exhaust gases of the engine monatomic-nitrogen induced by a pulse arc (see, for example, U.S. Pat. Nos. 5,526,641 and 5,640,845 that are assigned to the same assignee of record as the present application). While these systems tend to decrease the level of $NO_X$ in engine exhaust gases, they do not tend to decrease the total particulates that are present in those exhaust gases.

Accordingly, it is an object of the present invention to provide a new and improved method and apparatus for reducing total particulates in the exhaust of a diesel engine while minimizing the amount of $NO_X$ emissions in the exhaust.

It is another object of the present invention to provide a new and improved method and apparatus for reducing total particulates in the exhaust of a diesel engine by introducing controlled quantities of supplemental air (that may include oxygen-enriched air) directly into combustion chambers of the engine while the piston in each such chamber is in its expansion and/or exhaust strokes during the time that the combustion is in a diffusion and/or tail end phases of the chamber's combustion cycle.

It is still another object of the present invention to provide a new and improved method and apparatus for reducing the amount of total particulates in the exhaust of a diesel engine by introducing controlled quantities of supplemental air, that includes, at least in part, oxygen-enriched air produced by a selectively permeable membrane, directly into combustion chambers of the engine while the piston in each such chamber is in its expansion and/or exhaust strokes during the time that the combustion is in a diffusion and/or tail end phases of the chamber's combustion cycle.

It is yet another object of the present invention to provide a new and improved method and apparatus for reducing simultaneously the amount of total particulates and $NO_X$ in the exhaust of a diesel engine by utilizing both oxygen-enriched air and nitrogen-enriched air produced by a selectively permeable membrane. The oxygen-enriched air may be combined with ambient air and is injected in controlled quantities as supplemental air directly into combustion chambers of the engine while the piston in each such chamber is in its expansion and/or exhaust strokes during the time that the combustion is in a diffusion and/or tail end phases of the chamber's combustion cycle whereas the nitrogen-enriched air either is used to form monatomic nitrogen that is injected in the exhaust being emitted by the engine or is used to mix with intake air being supplied to the intake of the engine to lower the oxygen purity of the intake air.

It is still a further object of the present invention to provide a new and improved method and apparatus for reducing total particulates in the exhaust of a diesel engine by introducing controlled quantities of supplemental air (which may include oxygen-enriched air) directly into combustion chambers of the engine while the piston in each such chamber is in its expansion and/or exhaust strokes during the time that the combustion is in a diffusion and/or tail end phases of the chamber's combustion cycle and to simultaneously minimize $NO_X$ in the exhaust of the engine by either retarding the beginning of fuel injection or multi-stage injection of the diesel fuel or by recirculating a portion of the exhaust gases from the engine back into the intake of the engine (commonly known as exhaust gas recirculation—EGR).

SUMMARY OF THE INVENTION

In accordance with these and many other objects of the present invention, a combustion air management control system for a diesel engine embodying the present invention includes an injector associated with each of the cylinders or combustion chambers within the diesel engine so that supplemental air, which has been compressed to an elevated pressure, can be injected directly into each combustion chamber during an appropriate phases of the chamber's combustion cycle. Preferably, the pressurized supplemental air is introduced into each of the combustion chambers while the piston within the combustion chamber is in its expansion and/or exhaust strokes during the diffusion and/or tail end phases of the chamber's combustion cycle.

In one embodiment of the combustion air management control system embodying the present invention the supplemental air being injected into the combustion chambers includes at least in part oxygen-enriched air. A selectively permeable air separating membrane device is used for producing oxygen-enriched air and nitrogen-enriched air from air flowing towards an air intake manifold of the diesel engine. Depending on the engine design, the air being supplied to the intake manifold of the diesel engine from an air filter can be compressed by a compressor portion of a turbocharger and cooled by an inter-cooler. A portion of the air flowing toward the intake manifold is diverted through the permeable membrane device wherein a portion of the nitrogen in that air is separated from the air so that oxygen-enriched air (permeate) and nitrogen-enriched air (retentate) are produced at outlets of the permeable membrane device.

When the air is diverted directly from the air filter, the air flows through the permeable membrane device due to a pressure differential that is established across the permeable membrane device either by a compressor at an input of the permeable membrane device or a blower or pump at the input of the permeable membrane device and a vacuum pump at an output of the permeable membrane device. The oxygen-enriched air being produced at one of the outlets of the permeable membrane device may contain approximately 23% to 35% oxygen by volume (this is compared to ambient air which contains about 21% oxygen by volume). This oxygen-enriched air, either by itself or after being mixed with ambient air to control or vary the oxygen content of the air, can be considered supplemental air for the diesel engine. This supplemental air is pressurized to an elevated pressure (for example, to 500–2,000 psi (pounds per square inch)) by a compressor or pump. Controlled quantities of this pressurized supplemental, oxygen-enriched air is introduced directly into each of the combustion chambers of the diesel engine during an appropriate phases of the engine's combustion cycle. Preferably, the supplemental oxygen-enriched air is introduced into the combustion chamber while the piston within the combustion chamber is in its expansion and/or exhaust strokes during the diffusion and/or tail end phases of the chamber's combustion cycle.

The introduction of the supplemental oxygen-enriched air directly into the combustion chamber can be achieved using an injector (a nozzle with one or more orifices) on each of the cylinder heads at a geometrically feasible location to provide the appropriate mixing of the supplemental oxygen-enriched air with the igniting fuel. The timing of both the start of and duration of injecting the supplemental oxygen-enriched air, the flow rate of the air and fuel, and the purity of oxygen in the supplemental oxygen-enriched air can be optimized for a given engine and the operating conditions of that engine. By introducing the supplemental oxygen-enriched air directly into the cylinders of the diesel engine during the diffusion and/or tail end phases of the diesel combustion cycle while the piston within each cylinder of the diesel engine is in its expansion and/or exhaust strokes, turbulent mixing of the reactants in the cylinder occurs due to the jet momentum of the air being injected and also the oxygen concentration is increased in the gases surrounding burning fuel droplets. These changes in the mixing and chemical kinetics help to enhance soot and hydrocarbon oxidation reactions without adversely increasing $NO_X$ formation. This results in higher oxidation reaction rates being achieved such that smoke, unburned hydrocarbons, and particulate emissions can be reduced significantly. In addition, the retarding of the fuel injection timing (i.e., delaying the time in the engine cycle when fuel is injected into a cylinder—for example, the injection timing could be retarded between 4 and 10 degrees of crankshaft angle) tends to delay the beginning of combustion within the cylinder such that peak combustion temperatures can be lowered so that less $NO_X$ is formed and emitted from the engine. As a result, the total particulates and $NO_X$ in the diesel engine's exhaust can be reduced simultaneously.

The nitrogen-enriched air being produced at the another outlet of the permeable membrane device can be expelled to atmosphere. On the other hand, the nitrogen-enriched air can be used to further reduce $NO_X$ that tends to be formed in the diesel engine and that might be present in the exhaust of the diesel engine. For example, the nitrogen-enriched air can be mixed with air being supplied to the intake manifold of the engine (see, for example, the disclosure in U.S. Pat. No. 5,649,517) or alternatively, it can be introduced into a plasma device to generate monatomic nitrogen that is injected in the exhaust to react with $NO_X$ in the exhaust (see, for example, the disclosures in U.S. Pat. Nos. 5,526,641 and 5,640,845). In addition to the use of such nitrogen-enriched air in this manner to reduce $NO_X$ in the engine's exhaust or instead of using such nitrogen-enriched air, a portion of the exhaust gases can be recirculated back into the intake manifold of the diesel engine (this recirculation process is commonly known as exhaust gas recirculation or EGR). Such recirculated exhaust gases tend to lower the combustion temperatures within the combustion cylinders which thereby reduces the formation of $NO_X$ in the combustion chamber. The formation of $NO_X$ also can be further reduced by electronically controlling the timing and delivery of the injection of diesel fuel into the engine's cylinders. In this regard, the fuel injection can be retarded to delay the beginning of combustion within each cylinder.

In an alternative embodiment of the present invention, the air flowing from the intake air filter is diverted to the permeable membrane device after the air has been compressed by the compressor portion of the turbocharger so as to be at slightly elevated pressure (for example, to 30–35 psi). The elevation of the pressure of this intake air is sufficient to establish a differential pressure across the permeable membrane device so that the diverted air will flow through the permeable membrane device. The oxygen-enriched air that is produced at one of the outlets of the permeable membrane device is used as the supplemental air that is further pressurized (for example, to 500–2,000 psi) by a compressor and injected directly into the combustion cylinders during the expansion and/or exhaust strokes of the piston within each of those cylinders. In order to reduce the $NO_X$ in the exhaust gases being emitted from the engine, the nitrogen-enriched air produced at another outlet of the permeable membrane device can be mixed with air being supplied to the intake manifold of the engine or can be introduced into a plasma device to generate monatomic nitrogen that is injected into the engine's exhaust to react with $NO_X$ in the exhaust gases.

In still another alternative embodiment of the present invention, no permeable membrane device is utilized. Instead, the air flowing from the intake air filter is compressed by the compressor portion of the turbocharger so as to be at slightly elevated pressure (for example, to 30–35 psi). This somewhat pressurized air is used as supplemental air that is further pressurized by a compressor (for example, to 500–2,000 psi) and injected directly into the combustion cylinders during the expansion and/or exhaust strokes of the piston within each of those cylinders. In order to minimize $NO_X$ in the exhaust gases being emitted from the engine, fuel injection timing can be retarded and/or an EGR system can be employed whereby exhaust gases from the engine can be recirculated back into the air flowing into the intake manifold.

BRIEF DESCRIPTION OF THE DRAWINGS

These and many other objects and advantages of the present invention will become readily apparent from consideration of the following detailed description of the embodiments of the invention shown in the accompanying drawings wherein.

DETAILED DESCRIPTION OF THE PREFERRED EMBODIMENT

Figure 1:
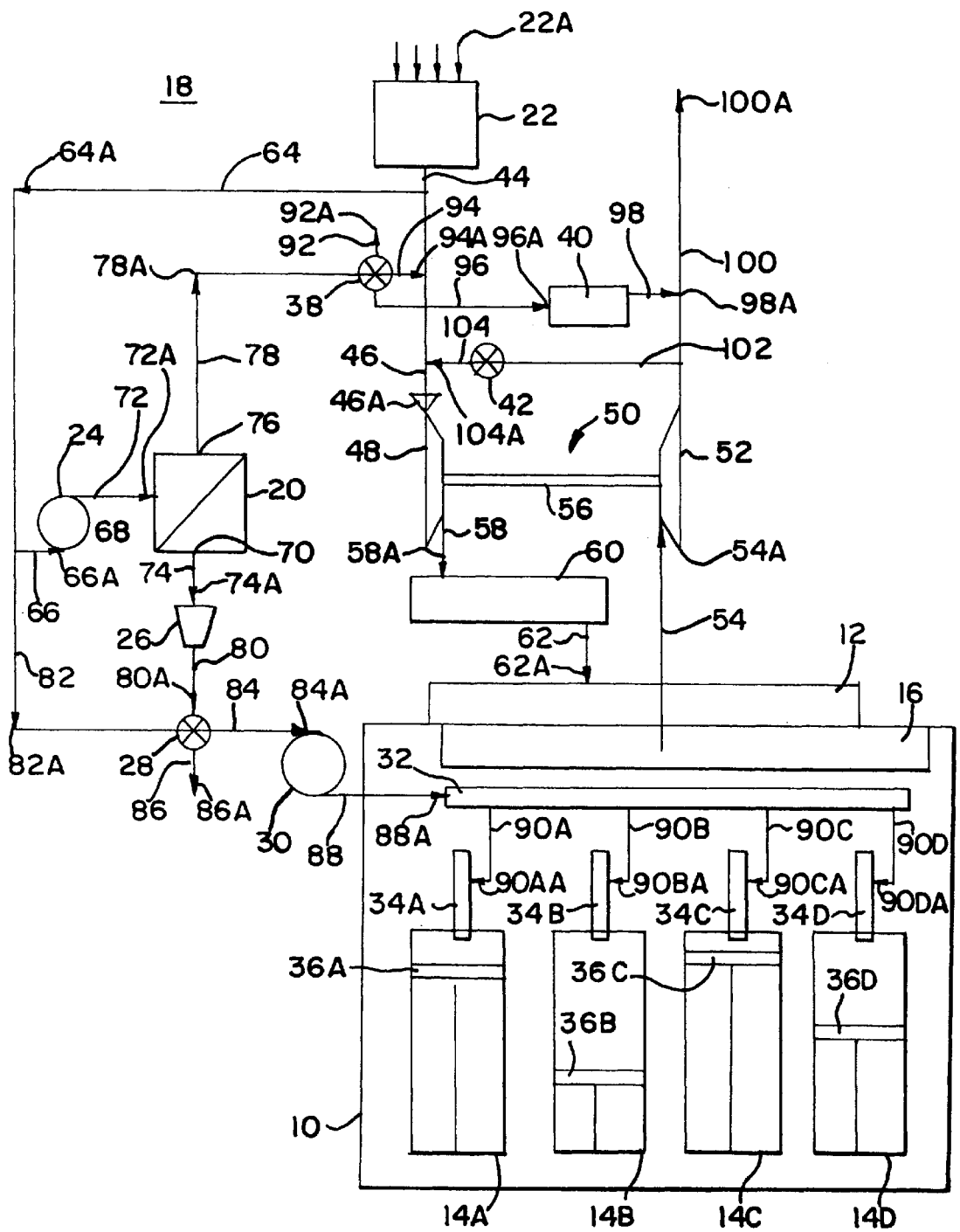
FIG. 1 is a diagrammatic illustration of a diesel engine with a combustion air management and emission control system which embodies the present invention, this particular embodiment employing a permeable membrane device to produce supplemental oxygen-enriched air that can be combined with intake air and injected under pressure directly into the combustion chambers of the diesel engine.

Referring now more specifically to FIG. 1, therein is disclosed a diagrammatic representation of a diesel engine 10 having an intake manifold 12 through which air is supplied to the engine 10 to be combined with combustible fuel in cylinders or combustion chambers 14A–14D of the engine 10. When the intake air and the combustible fuel are combusted in the engine 10, exhaust gases are expelled from an exhaust manifold 16 in the engine 10. The exhaust gases flowing from the exhaust manifold 16 can contain a number of different pollutants including total particulates (carbon soot and volatile organics) and visible smoke and oxides of nitrogen ($NO_X$). In order to limit the amount of these undesirable emissions that are present in the exhaust gases being emitted from the engine 10 through the exhaust manifold 16, the engine 10 is provided with a combustion air management or emission control system that is generally designated by the reference numeral 18 and that embodies the present invention.

The combustion air management control system 18 includes an air separation permeable membrane device 20 that separates nitrogen from air flowing through the air separation membrane device 20 such that oxygen-enriched air and nitrogen-enriched air are produced. During the operation of the engine 10, ambient or atmospheric air flows through an air filter 22 towards the intake manifold 12. When a blower 24 and a vacuum pump 26 are activated, a portion of the air flowing from the air filter 22 is diverted and flows to the air separation membrane 20. The diverted air flows through the air separation membrane 20 due to the pressure differential established across the membrane device 20 by the blower 24 and the vacuum pump 26 (a compressor can be used in place of the blower 24 in which case the vacuum pump 26 will not be necessary). The air separation membrane 20 separates nitrogen from the air flowing through the air separation membrane 20 such that oxygen-enriched air (permeate) flows to a mixing valve 28.

The oxygen-enriched air flowing to the mixing valve 28 can be mixed with ambient air from the air filter 22 so that supplemental air consisting of oxygen-enriched air from the air separation membrane 20 and if desired, ambient air from the air filter 22, flow to a high pressure, supplemental air compressor or pump 30. The compressor 30 compresses the supplemental air to an elevated pressure which supplemental pressurized air is supplied to a high pressure air rail or air accumulator 32. The supplemental oxygen-enriched air then can be injected directly into the cylinders 14A–14D of the diesel engine 10 through electronically controlled air injectors 34A–34D associated respectively with each of the cylinders 14A–14D.

The timing of both the start of and duration of injecting the supplemental oxygen-enriched air, the flow rate of the air and fuel, and the purity of oxygen in the supplemental oxygen-enriched air can be optimized for the particular diesel engine 10 and the operating conditions of that engine 10. By introducing the supplemental oxygen20 enriched air directly into the cylinders 14A–14D during the diffusion and/or tail end phases of the diesel combustion cycle while pistons 36A–36D within each of the cylinders 14A–14D respectively are in their expansion and/or exhaust strokes, turbulent mixing of the reactants in the cylinders 14A–14D occurs due to the jet momentum of the air being injected and also the oxygen concentration is increased in the gases surrounding burning fuel droplets. These changes in the mixing and chemical kinetics help to enhance soot and hydrocarbon oxidation reactions without adversely increasing $NO_X$ formation. This results in higher oxidation reaction rates being achieved such that smoke, unburned hydrocarbons, and particulate emissions can be reduced significantly. In addition, the retarding of the fuel injection timing tends to delay the beginning of combustion within each of the cylinders 14A–14D such that peak combustion temperatures within the cylinders 14A–14D can be lowered resulting in less $NO_X$ being formed and emitted from the exhaust manifold 16 of the engine 10. As a result, the total particulates and $NO_X$ in the engine's exhaust can be reduced simultaneously.

In order to further reduce the $NO_X$ in the exhaust gases being emitted from the exhaust manifold 16, the nitrogen-enriched air being produced by the permeable membrane 20 can be used. The nitrogen-enriched air may be supplied via a control valve 38 so as to be mixed with ambient air flowing from the air filter 22 to the intake manifold 12 of the engine 10 or so as to be introduced into a plasma device or monatomic nitrogen generator 40 to generate monatomic nitrogen that is injected into the exhaust of the engine 10 to react with $NO_X$ in the exhaust.

In addition to the use of such nitrogen-enriched air in this manner to reduce $NO_X$ in the engine's exhaust or instead of so using such nitrogen-enriched intake air, a portion of the exhaust gases can be recirculated back into the intake air flowing from the air filter 22 via a EGR control valve 42 (this recirculation process is commonly known as exhaust gas recirculation or EGR). Such recirculated exhaust gases tend to lower the combustion temperatures within the combustion cylinders 14A–14D which thereby reduces the formation of $NO_X$ in the combustion chambers 14A–14D. The formation of $NO_X$ also can be further reduced by electronically controlling the timing and delivery of the injection of diesel fuel into the engine's cylinders 14A–14D. In this regard, the fuel injection can be retarded to delay the beginning of combustion within each of the cylinders 14A–14D or rate shaping of the fuel delivery can be used.

As previously indicated, ambient air for use in the engine 10 flows through the air filter 22 as indicated by arrows 22A to an air duct 44. As long as the blower 24 and the vacuum pump 26 are not activated, all of the air flowing in the air duct 44 and an air duct 46 (as represented by an arrow 46A) will flow into a compressor portion 48 of a turbocharger 50. The compressor 48 of the turbo10 charger 50 compresses (i.e., elevates in pressure—for example, to a pressure of 30–35 psi) the air flowing into the compressor 48 from the duct 46. A turbine portion 52 of the turbocharger 50 is driven by the energy from the exhaust gases being emitted from the exhaust manifold 16 through an exhaust duct 54 (as indicated by an arrow 54A). The exhaust gases within the exhaust duct 54 are at elevated temperatures so the energy from those gases can be used to drive the turbine portion 52 of the turbocharger 50 such that a shaft 56 is rotated thereby driving the compressor portion 48. The pressurized air from the compressor 48 flows out from the compressor portion 48 through an air duct 58 (as indicated by an arrow 58A) to an inter-cooler 60. The inter-cooler 60 is designed to act as a heat exchanger to cool the intake air flowing into the intake manifold 12. The cooling of the intake air tends to decrease the amount of $NO_X$ formed in the engine 10. Once the intake air is cooled by the inter-cooler 60, it flows out of the intercooler 60 via an air duct 62 (as indicated by an arrow 62A) and is supplied to the intake manifold 12 so that it can be combined with combustible fuel in the cylinders 14A–14D.

When the blower 24 and the vacuum pump 26 are activated, a portion of ambient air flowing out through the air filter 22 is diverted from the air duct 44 and flows along an air duct 64 (as indicated by an arrow 64A) and an air duct 66 (as indicated by an arrow 66A) to the blower 24. The flow of the diverted air along the air ducts 64 and 66 is caused by a pressure differential that is established across the air separation membrane 20 between an input 68 of the membrane device 20 and an outlet 70 (permeate) of the membrane device 20 (i.e., the pressure is higher at the input 68 as compared to the outlet 70). This differential in pressure across the membrane device 20 will result in air flowing from the blower 24 through an air duct 72 (as indicated by an arrow 72A) into the input 68 and through the membrane device 20 so that supplemental oxygen-enriched air will permeate from the higher pressure, upstream side of the membrane device 20 at the input 68 to the lower pressure, downstream side of the membrane device 20 at the outlet 70 and thereby to an outlet duct 74. On the other hand, nitrogen-enriched air will likewise flow out of another outlet 76 (retentate) of the membrane device 20 into an outlet duct 78.

The membrane device 20 is adapted to separate oxygen and nitrogen present in the air being supplied through the input 68 so as to produce supplemental oxygen-enriched air (permeate) at the outlet 70 and nitrogen-enriched air (retentate) at the other outlet 76. The membrane device 20 can be of the type having a selectively permeable membrane that can separate or enrich gaseous mixtures. An example of such a membrane is disclosed in U.S. Pat. Nos. 5,051,113 and 5,051,114, both having been issued on Sep. 24, 1991. As indicated in those patents, such a membrane can be used to produce oxygen-enriched air by separating oxygen and nitrogen present in the air. An example of one possible configuration for such a membrane device 20 is illustrated in FIGS. 6 and 7A–7C of U.S. Pat. No. 5,636,619 and FIGS. 3 and 3A–3C of U.S. Pat. No. 5,649,517, both of which patents are assigned to the assignee of the present application. Alternatively, any other suitable source of oxygen-enriched air can be used in place of or in addition to the membrane device 20.

The particular percentage of oxygen contained within the supplemental oxygen-enriched air flowing out from the outlet 70 of the membrane device 20 and the particular percentage of nitrogen contained within the nitrogen-enriched air flowing out from the outlet 76 of the membrane device 20 can be adjusted by providing the proper membrane device 20. In this regard, the membrane properties, the coating thickness, the membrane surface area and the pressure differential across the membrane device 20 will in part determine the amount of nitrogen separated from the air flowing into the input 68 and thereby the percentage of oxygen within the air flowing out from the outlet 70. In general, the supplemental oxygen-enriched air flowing from the outlet 70 of a membrane device, like the membrane device 20, may contain from about 23% to about 35% oxygen concentration by volume (this is compared to ambient air which contains about 21% oxygen by volume).

Once the supplemental oxygen-enriched air is produced by the membrane device 20, it will flow from the outlet 70 through the outlet duct 74 (as indicated by an arrow 74A) to the vacuum pump 26 and then through an air duct 80 (as indicated by an arrow 80A) to the mixing valve 28. The mixing valve 28 controls the amount of supplemental oxygen-enriched air flowing in the air duct 80 and the amount of ambient air that is flowing in an air duct 82 (as indicated by an arrow 82A) that is supplied as supplemental air through an air duct 84 (as indicated by an arrow 84A) to the compressor 30 and/or the amount of such air that is expelled to atmosphere through an air duct 86 as indicated by an arrow 86A.

The compressor or pump 30 will further pressurize the supplemental air flowing out from the mixing valve 28 so that it will be at a sufficiently elevated pressure that it can be injected directly into the cylinders 14A–14D of the diesel engine 10. For example, the compressor 30 (which can be of a piston, diaphragm or rotary type and alternatively can be a pump) can be designed to pressurize the supplemental air flowing from the compressor 30 to a pressure of 500 psi to 2,000 psi. In general, the pressure should be sufficiently higher than the cylinder combustion pressure so that the supplemental air can be injected directly into the cylinders 14A–14D during the appropriate time in the combustion cycle of the cylinders 14A–14D. This pressurized supplemental air containing oxygen-enriched air flows through an air duct 88 (as indicated by the arrow 88A) to the high pressure air rail or air accumulator 32.

The air rail 32 is in fluid communication with the air injectors 34A–34D via air ducts 90A–90D respectively, so that the pressurized supplemental air from the air rail 32 will flow in the air ducts 90A–90D (as indicated by arrows 90AA, 90BA, 90CA and 90DA) to the air injectors 34A–34D. The air injectors 34A–34D are in turn respectively associated with each of the cylinders 14A–14D. The air injectors 34A–34D are adapted to inject controlled quantities of supplemental pressurized air from the air rail 32 directly into the cylinders 14A–14D at the appropriate point or time in the combustion cycle of the each of those cylinders 14A–14D. The injectors 14A–14D my have nozzles with one or more orifices and are located at the top of the cylinders 14A–14D at a geometrically feasible location to inject the supplemental air that is to be mixed with fuel within the cylinders 14A–14D. The injectors 34A–34D can be of the type for injecting both fuel and supplemental air in the same injectors into the cylinders 14A–14D, in which case the injectors 34A–34D would each have separate inputs for the fuel and the supplemental air. One type of injector that possibly could be used for the injectors 14A–14D is an injector similar to the one disclosed in an article entitled "Natural gas fueling of diesel engines" appearing in *Automotive Engineering*, November 1996, pages 87–90. While the injector disclosed in that article is designed to inject both diesel fuel and compressed natural gas, it also could be used to supply the diesel fuel and the pressurized supplemental air to the cylinders 14A–14D in the engine 10.

The combustion cycle of a typical diesel engine, such as the depicted engine 10, can be described as having three combustion phases, i.e., pre-mix, diffusion and tail end. The pre-mix combustion phases is the portion of the combustion cycle during which diesel fuel and intake air are mixed within the cylinder 14A as the piston 36A is moving in its compression stroke toward its top dead center position. After certain physical and chemical delays, ignition of the fuel begins to occur. The actual beginning of the ignition of the fuel and air mixture can be controlled to some extent by when the fuel is injected into the cylinder 14A. Retarding the injection timing (i.e., delaying the time when the fuel is being injected into the cylinder 14A with respect to the position of the piston 36A) tends to delay the ignition of the fuel so that lower amounts of $NO_X$ are formed because the temperature generated within the cylinder 14A during the pre-mix combustion phase tends to be lowered. For example, the injection timing could be retarded between 4 and 10 degrees of crankshaft angle. On the other hand, the fuel does not tend to be burned completely when the injection timing is retarded so that additional amounts of particulates such as soot can be formed.

Once the pre-mix combustion phase is completed, what can be termed the diffusion combustion phase of the combustion cycle occurs. During this phase, the piston 36A reverses its direction of travel such that it begins its expansion stroke. As the piston 36A is traveling in its expansion stroke, the electronically controlled air injector 34A injects the highly pressurized supplemental oxygen-enriched air from the air rail 32 in small, controlled quantities into the cylinder 14A. At this point in the combustion cycle of the cylinder 14A, the temperature within the cylinder 14A is still sufficiently high that the introduction of the small quantities of supplemental oxygen-enriched air will promote the further oxidation of any fuel or particulates still in the combustion chamber 14A, but the temperature is low enough that the formation of $NO_X$ is not significantly promoted.

Once this further combustion is accomplished, what can be termed the tail end combustion phase of the engine's combustion cycle will be occur. During this time, the piston 36A will complete its expansion stroke and the gases within the cylinder 14A will be exhausted through the exhaust manifold 16 to the exhaust duct 54. As a result of the additional oxidation that occurs due to the injection of supplemental oxygen-enriched air into the cylinder 14A during the expansion stroke of the piston 36A, visible smoke, total particulates, hydrocarbons, and carbon monoxide being emitted from the exhaust manifold 16 into the exhaust duct 54 will be significantly reduced.

While the amount of total particulates in the exhaust being emitted from the exhaust manifold 16 of the engine 10 are reduced, the amount of $NO_X$ in that exhaust flowing in the exhaust duct 54 may still be significant. In order to minimize the $NO_X$ present in that exhaust, the nitrogen-enriched air flowing from the outlet 76 of the membrane device 20 can be utilized by introducing the nitrogen-enriched air into the intake manifold 12 via the control valve 38 or by supplying the nitrogen-enriched air to the monatomic nitrogen generator 40 via the control valve 38 so that atomic nitrogen can be injected into the exhaust gases flowing from the exhaust duct 54.

As previously indicated, the nitrogen-enriched air (retentate) that is flowing from the outlet 76 flows through the outlet duct 78 (as indicated by an arrow 78A) to the flow control valve 38. If the nitrogen-enriched air is not to be used in controlling pollutants being generated by the engine 10, the control valve 38 can be actuated to release the nitrogen-enriched air to atmosphere via an air duct 92 (as indicated by an arrow 92A). On the other hand, the nitrogen-enriched air flowing in the outlet duct 78 from the outlet 76 can be directed by the control valve 38 either into the air duct 46 where it becomes mixed with the intake air from the air filter 22 or to the monatomic nitrogen generator 40.

In the case where the nitrogen-enriched air or at least a part of the nitrogen-enriched air flowing in the outlet duct 78 to the control valve 38 is to be directed to the intake manifold 12, the control valve 38 is actuated so that at least a portion of that nitrogen-enriched air flows through an air duct 94 (as indicated by an arrow 94A) into the air duct 46. The nitrogen-enriched air becomes combined with or mixed with the intake air flowing in the air duct from the air filter 22 and becomes part of the intake air being supplied to the intake manifold 12. As is in part disclosed in U.S. Pat. No. 5,649,517, the addition of nitrogen-enriched air into the air being introduced into the engine 10 through the intake manifold 12 tends to act as a diluent to reduce the combustion temperatures within the cylinders 14A–14D of the engine 10 so as to lower the amount of $NO_X$ that is formed in the engine 10.

In the case where the nitrogen-enriched air being produced at the outlet 76 of the membrane device 20 and flowing in the outlet duct 78 is to be supplied to the monatomic nitrogen generator 40, the control valve 38 is actuated to divert at least a portion of that nitrogen-enriched air through an air duct 96 (as indicated by an arrow 96A) to the monatomic nitrogen generator 40.

The nitrogen-enriched air flowing in the air duct 96 is supplied to the monatomic nitrogen generator 40. As is disclosed in U.S. Pat. No. 5,526,641 and 5,640,845, the monatomic nitrogen generator 40 converts into atomic nitrogen the molecular nitrogen present in the nitrogen-enriched air flowing in the air duct 96. In order to accomplish this conversion, the monatomic nitrogen generator 40 includes one or more arc creating devices so that a corona or arc discharge is produced to create a plasma within the monatomic nitrogen generator 40. One type of such arc creating device is a spark plug type of a device (an example of such a device is disclosed in U.S. Pat. No. 5,640,845) and more than one spark plug (for example, four spark plugs) can be used to generate a sufficient arc that results in a plasma being produced such that the molecular nitrogen will be transformed into atomic nitrogen. Alternatively, a corona charge along the elongated axis of a cylindrical wire placed in the middle of a round tube can be used. The wire in the center of the tube is either positively or negatively charged while the tube is oppositely charged to create a corona charge.

The atomic nitrogen formed in the monatomic nitrogen generator 40 is supplied through an air duct 98 (as indicated by an arrow 98A) to an exhaust duct 100 through which flows (as indicated by an arrow 100A) the exhaust gas stream that is being expelled from the engine 10 and that flows through the exhaust duct 54 and the turbine portion 52 of the turbocharger 50. The injection of atomic nitrogen into a stream of gases containing $NO_X$ will result in the reduction of the $NO_X$ to nitrogen and oxygen. Consequently, the injection of the atomic nitrogen being supplied from the monatomic nitrogen generator 40 into the exhaust duct 100 will decrease the amount of $NO_X$ in the exhaust gases flowing in the exhaust duct 100 due to the reduction of such $NO_X$ to nitrogen and oxygen. As a result, the amount of $NO_X$ in the exhaust gases being expelled into the atmosphere from the exhaust duct 100 will tend to be at more acceptable levels.

As indicated above, the level of $NO_X$ in the exhaust gases flowing to atmosphere through the exhaust duct 100 can further be reduced by utilizing the EGR control valve 42. When the EGR control valve 42 is actuated, a portion of the exhaust gases flowing in the exhaust duct 100 will flow through ducts 102 and 104 (as indicated by an arrow 104) into the air duct 46 wherein the exhaust gases will become mixed with the intake air flowing from the air filter 22 to the intake manifold 12. The injection of such recirculated exhaust gases into the intake air tends to lower the combustion temperatures within the combustion cylinders 14A–14D and the formation of $NO_X$ in the combustion chambers 14A–14D tends to be retarded. The use of such recirculated exhaust gases to control the level of $NO_X$ in the exhaust gases flowing in the exhaust duct 100 can be used in addition to or instead of the injection into the exhaust duct 100 of monatomic nitrogen produced by the monatomic nitrogen generator 40 from the nitrogen-enriched air produced at the outlet 76 of the membrane device 20 or the injection of such nitrogen-enriched air into the air duct 46 so as to be combined with intake air flowing to the intake manifold 12. The formation of $NO_X$ also can be further reduced by electronically controlling the timing and delivery of the injection of diesel fuel into the engine's cylinders 14A–14D. In this regard, the fuel injection can be retarded to delay the beginning of combustion within each cylinder 14A–14D.

Figure 2:
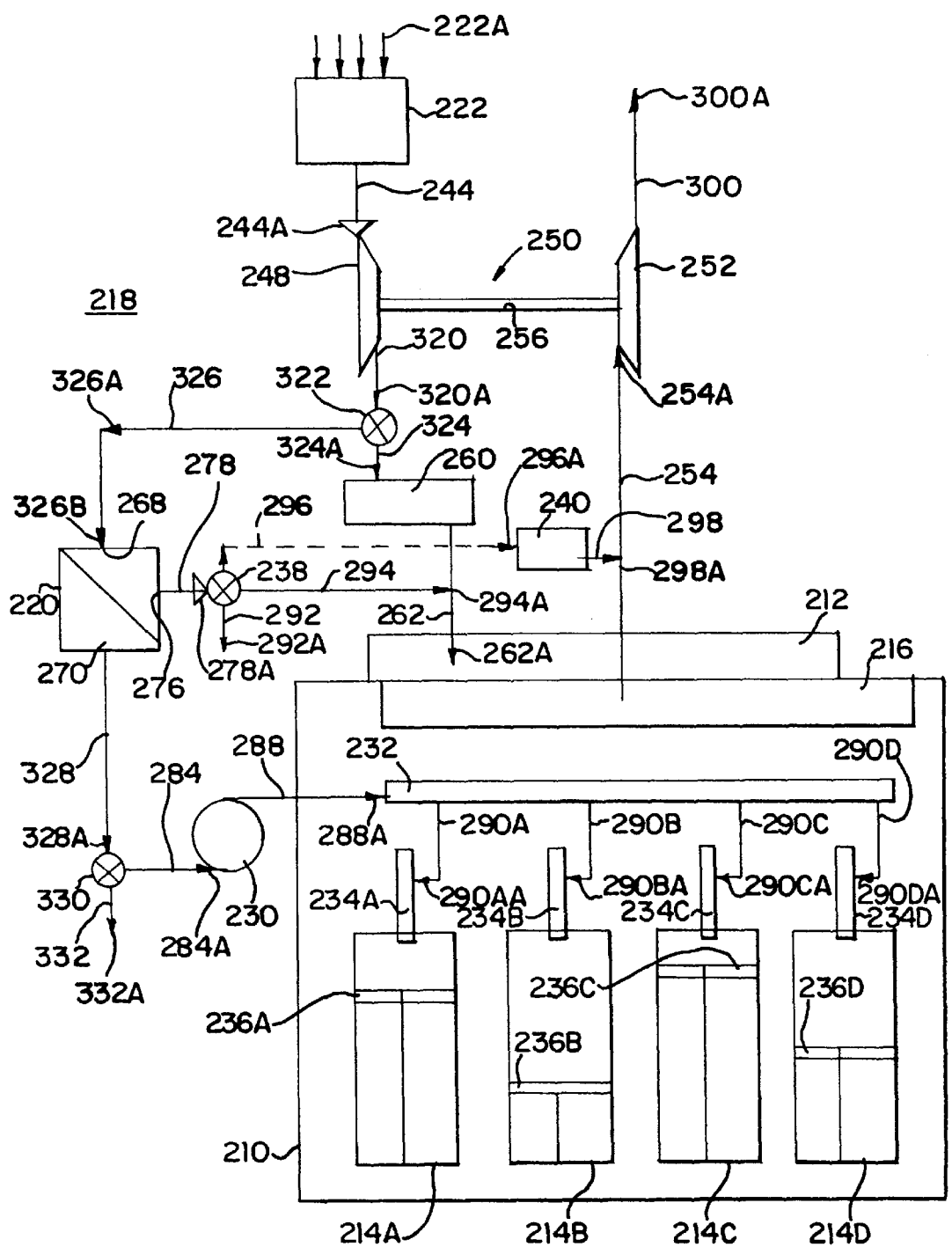
FIG. 2 is a diagrammatic illustration of a diesel engine with an alternate embodiment of a combustion air management and emission control system which embodies the present invention, this particular embodiment employing a permeable membrane device to produce supplemental oxygen-enriched air that is injected under pressure directly into the combustion chambers of the diesel engine.
Figure 3:
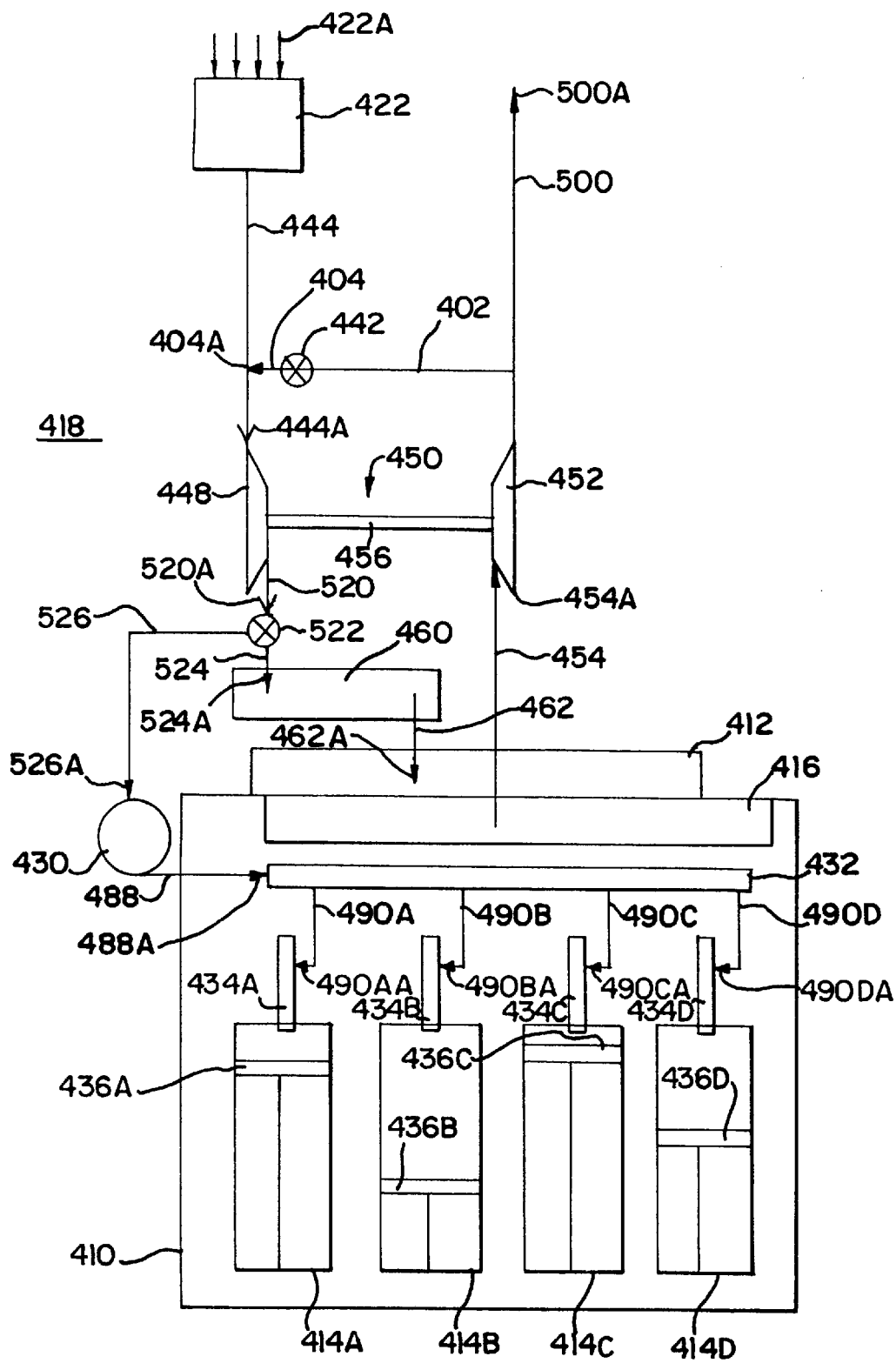
FIG. 3 is a diagrammatic illustration of a diesel engine with another alternate embodiment of a combustion air management and emission control system which embodies the present invention, this particular embodiment injects supplemental intake air under pressure directly into the combustion chambers of the diesel engine.

An alternate embodiment of the present invention is disclosed in FIG. 2 of the drawings. In that FIG. 2, therein is disclosed a diagrammatic representation of a diesel engine 210 having an intake manifold 212 through which air is supplied to the engine 210 to be combined with combustible fuel in cylinders or combustion chambers 214A–214D of the engine 210. In order to limit the amount of undesirable emissions that are present in the exhaust gases being emitted from the engine 210 through an exhaust manifold 216, the engine 210 also is provided with a combustion air management or emission control system that is generally designated by the reference numeral 218 and that embodies the present invention. The engine 210 and the combustion air management and emission control system 218 include many of the same components included in the engine 10 and the combustion air management and emission control system 18. Consequently, the components of the engine 210 and the combustion air management and emission control system 218 that are specifically referred to herein are referenced by the same reference numerals as the corresponding components in the engine 10 and the combustion air management and emission control system 18 except that the quantity 200 has been added to the reference numerals.

In the case of the combustion air management and emission control system 218, supplemental oxygen-enriched air and nitrogen-enriched air are produced by a permeable membrane device 220 in essentially the same manner as such supplemental air is produced by the permeable membrane device 20. In the case of the combustion air management and emission control system 18, a pressure differential across the membrane device 20 was established by the blower 24 and the vacuum pump 26. In the case of the combustion air management and emission control system 218, such a blower and vacuum pump are not necessary because the intake air is diverted to an input 268 of the membrane device 220 after the intake air has been somewhat elevated in pressure by a compressor portion 248 of a turbocharger 250. In this regard, ambient air flows through an air filter 222 (as indicated by arrows 222A) and an air duct 244 (as indicated by an arrow 244A) so as to be compressed by a compressor 248 of a turbocharger 250 (i.e., the air is elevated in pressure—for example, to a pressure of 30–35 psi). This pressurized intake air flows from the compressor 248 through an air duct 320 (as indicated by an arrow 320A) to an air diverter valve 322. The valve 322 can be actuated to allow all of the intake air flowing in the air duct 320 to flow through an air duct 324 (as indicated by an arrow 324A) and then through an inter-cooler 260 and an air duct 262 (as indicated by an arrow 262A) to the intake manifold 212 so that it can be combined with combustible fuel in the cylinders 14A–14D.

The valve 322 also can be activated such that a portion of the intake air flowing in the air duct 320 is diverted to and flows along an air duct 326 (as indicated by arrows 326A and 326B) to the input 268 of the membrane device 220. The flow of the diverted air along the air duct 326 occurs because the air flowing out of the compressor 248 is sufficiently pressurized to establish a pressure differential across the air separation membrane 220 between the input 268 and an outlet 270 of the membrane device 220 (i.e., the pressure is higher at the input 268 as compared to the outlet 270). This differential in pressure across the membrane device 220 will result in air flowing from the input 268 through the membrane device 220 so that supplemental oxygen-enriched air will permeate from the higher pressure, upstream side of the membrane device 220 at the input 268 to the lower pressure, downstream side of the membrane device 220 at the outlet 270 and thereby to an outlet duct 328. On the other hand, nitrogen-enriched air will likewise flow out of another outlet 276 of the membrane device 220 into an outlet duct 278.

As is discussed with respect to the membrane device 20, the membrane device 220 is adapted to separate oxygen and nitrogen present in the air being supplied through the input 268 so as to produce supplemental oxygen-enriched air (permeate) at the outlet 270 and nitrogen-enriched air (retentate) at the other outlet 276. The membrane device 220 can be of the same type as permeable membrane device 20. Once the supplemental oxygen-enriched air is produced by the membrane device 220, it will flow through the outlet duct 328 (as indicated by an arrow 328A) to a control valve 330. The control valve 330 controls the amount of supplemental oxygen-enriched air that will flow through an air duct 284 (as indicated by an arrow 284A) to a compressor 230. In this regard, a portion of the supplemental oxygen-enriched air flowing through the outlet duct 328 can be expelled to atmosphere through an air duct 332 as indicated by an arrow 332A.

The remaining portion of the supplemental oxygen-enriched air will flow through the air duct 284 and will be further pressurized by the compressor 230 so that the supplemental oxygen-enriched air will be at a sufficiently elevated pressure that it can be injected directly into the cylinders 214A–214D of the diesel engine 210. For example, the compressor 230 can be designed to pressurize the supplemental air flowing from the compressor 230 to a pressure of 500 psi to 2,000 psi. In general, the pressure should be sufficiently higher than the cylinder combustion pressure so that the supplemental air can be injected directly into the cylinders 214A–214D during the appropriate time in the combustion cycle of the cylinders 214A–214D. This pressurized supplemental air containing oxygen-enriched air flows through an air duct 288 (as indicated by the arrow 288A) to a high pressure air rail or air accumulator 232.

The air rail 232 is in fluid communication with air injectors 234A–234D via air ducts 290A–290D respectively, so that the pressurized supplemental oxygen-enriched air from the air rail 232 will flow in the air ducts 290A–290D (as indicated by arrows 290AA, 290BA, 290CA and 290DA) to the air injectors 234A–234D. The air injectors 234A–234D are in turn respectively associated with each of the cylinders 214A–214D. As with the air injectors 34A–34D, the air injectors 234A–234D are adapted to inject controlled quantities of supplemental pressurized oxygen-enriched air from the air rail 232 directly into the cylinders 214A–214D at the appropriate point or time in the combustion cycle of the each of those cylinders 214A–214D. As is discussed above with respect to the combustion air management and emission control system 18, controlled quantities of the supplemental oxygen-enriched air from the air rail 232 are injected into the cylinders 214A–214D during the time in the combustion cycle of those cylinders 214A–214D when pistons 236A–236D are in their expansion and/or exhaust strokes. The injection of supplemental oxygen-enriched air directly into the combustion chambers 214A–214D during the diffusion and/or tail end phases of the combustion cycle provides turbulent mixing of the reactants in the cylinders 214A–214D due to the jet momentum of the air being injected and also increases the oxygen concentration in the gases surrounding burning fuel droplets. These changes in the mixing and chemical kinetics help to enhance soot and hydrocarbon oxidation reactions without adversely increasing $NO_X$ formation. As a result of the enhanced oxidation reactions that occur due to the injection of the supplemental oxygen-enriched air into the cylinders 214A–214D during the expansion and/or exhaust strokes of the pistons 236A–236D, visible smoke, total particulates, hydrocarbons, and carbon monoxide being emitted from the exhaust manifold 216 into the exhaust duct 254 will be significantly reduced.

The amount of $NO_X$ in the exhaust flowing in the exhaust duct 254 can be minimized in the same manner that the $NO_X$ flowing in the exhaust duct 100 is minimized in the case of the combustion air management control system 18. More specifically, the $NO_X$ present in the exhaust gases flowing in the exhaust duct 254 can be reduced by utilizing the nitrogen-enriched air flowing from the outlet 276 of the membrane device 220 either by introducing the nitrogen-enriched air into the intake manifold 212 via a control valve 238 or by supplying the nitrogen-enriched air to a monatomic nitrogen generator 240 via the control valve 238 so that atomic nitrogen can be injected into the exhaust gases flowing in the exhaust duct 254. In this regard, the control valve 238 can be actuated to expel the nitrogen-enriched air flowing in the air duct 278 (as indicated by an arrow 278A) to atmosphere through an air duct 292 (as indicated by an arrow 292A); to supply the nitrogen-enriched air via an air duct 296 (as indicated by an arrow 296A) to the monatomic nitrogen generator 240 which converts into atomic nitrogen the molecular nitrogen present in the nitrogen-enriched air so that the atomic nitrogen can be injected into the exhaust duct 254 via an air duct 298 (as indicated by an arrow 298A); or to supply the nitrogen-enriched air into the air duct 262 via an air duct 294 (as indicated by an arrow 294A) so that it becomes combined with or mixed with the intake air flowing in the air duct 262 and becomes part of the intake air being supplied to the intake manifold 212.

This utilization of the nitrogen-enriched air to inject monatomic nitrogen into the exhaust duct 254 or to become part of the intake air being supplied to the intake manifold 212 are ways to minimize the amount of $NO_X$ flowing from the exhaust duct 300 (as indicated by an arrow 300A). As is discussed in connection with the combustion air management or emission control system 18, the $NO_X$ flowing from the exhaust duct 300 also can be reduced by using an EGR system or by retarding the fuel injection timing to delay the beginning of the combustion within the cylinders 214A–214D.

In certain instances, it is not practical or suitable to provide a source of oxygen-enriched air such as the membrane devices 20 and 220 in the case of the combustion air management or emission control systems 18 and 218 respectively. Some of the benefits derived from those systems 18 and 218 nevertheless can be attained by an combustion air management or emission control system 418 disclosed in FIG. 3. In that FIG. 3, therein is disclosed a diagrammatic representation of a diesel engine 410 having an intake manifold 412 through which air is supplied to the engine 410 to be combined with combustible fuel in cylinders or combustion chambers 414A–414D of the engine 410. In order to limit the amount of undesirable emissions that are present in the exhaust gases being emitted from the engine 410 through an exhaust manifold 416, the engine 410 also is provided with the combustion air management or emission control system that is generally designated by the reference numeral 418 and that embodies the present invention. The engine 410 and the combustion air management and emission control system 418 include many of the same components included in the engine 10 and the combustion air management and emission control system 18. Consequently, the components of the engine 410 and the combustion air management and emission control system 418 that are specifically referred to herein are referenced by the same reference numerals as the corresponding components in the engine 10 and the combustion air management and emission control system 18 except that the quantity 400 has been added to the reference numerals.

In connection with the engine 410, ambient air flows through an air filter 422 (as indicated by arrows 422A) and an air duct 444 (as indicated by an arrow 444A) so as to be compressed by a compressor 448 of a turbocharger 450 (i.e., the air is elevated in pressure—for example, to a pressure of 30–35 psi). This pressurized intake air flows from the compressor 448 through an air duct 520 (as indicated by an arrow 520A) to an air diverter valve 522. The valve 522 can be actuated to allow all of the intake air flowing in the air duct 520 to flow through an air duct 524 30 (as indicated by an arrow 524A) and then through an intercooler 460 and an air duct 462 (as indicated by an arrow 462A) to the intake manifold 412 so that it can be combined with combustible fuel in the cylinders 414A–414D.

The valve 522 also can be activated such that a portion of the intake air flowing in the air duct 520 is diverted to and flows along an air duct 526 (as indicated by an arrow 526A) to a compressor 430. The air flowing to the compressor 430 will be further pressurized by the compressor 430 so that this pressurized supplemental air will be at a sufficiently elevated pressure that it can be injected directly into the cylinders 414A–414D of the diesel engine 410. For example, the compressor 430 can be designed to pressurize the supplemental air flowing from the compressor 230 to a pressure of 500 psi to 2,000 psi. In general, the pressure should be sufficiently higher than the cylinder combustion pressure so that the supplemental air can be injected directly into the cylinders 414A–414D during the appropriate time in the combustion cycle of the cylinders 414A–414D. This pressurized supplemental air flows through an air duct 488 (as indicated by the arrow 488A) to a high pressure air rail or air accumulator 432.

The air rail 432 is in fluid communication with air injectors 434A–434D via air ducts 490A–490D respectively, so that the pressurized supplemental air from the air rail 432 will flow in the air ducts 490A–490D (as indicated by arrows 490AA, 490BA, 490CA and 490DA) to the air injectors 434A–434D. The air injectors 434A–434D are in turn respectively associated with each of the cylinders 414A–414D. As with the air injectors 34A–34D, the air injectors 434A–434D are adapted to inject controlled quantities of supplemental pressurized air from the air rail 432 directly into the cylinders 414A–414D at the appropriate point or time in the combustion cycle of the each of those cylinders 414A–414D. As is discussed above with respect to the combustion air management and emission control system 18, controlled quantities of the supplemental air from the air rail 432 are injected into the cylinders 414A–414D during the time in the combustion cycle of those cylinders 414A–414D when pistons 436A–436D are in their expansion and/or exhaust strokes. Even though the supplemental air being injected into the cylinders 414A–414D does not have increased quantities of oxygen, oxidation within the cylinders 414A–414D during the expansion and/or exhaust strokes of the pistons 436A–436D nevertheless tends to be promoted. The injection of supplemental air directly into the combustion chambers 414A–414D during the diffusion and/ or tail end phases of the combustion cycle provides turbulent mixing of the reactants in the cylinders 414A–414D due to the jet momentum of the air being injected. These changes in the mixing kinetics help to enhance soot and hydrocarbon oxidation reactions without adversely increasing $NO_X$ formation. As a result, visible smoke, total particulates, hydrocarbons, and carbon monoxide being emitted from the exhaust manifold 416 into an exhaust duct 454 will be reduced.

While the injection of supplemental air directly into the cylinders 414A–414D of the engine 410 tends to reduce the particulates in the exhaust gases flowing through the exhaust ducts 454 and 500, the level of $NO_X$ in the exhaust gases flowing to atmosphere through the exhaust duct 500 can be reduced by utilizing an EGR system. In this regard, an EGR control valve 442 is used to control the amount, if any, of the exhaust gases flowing in the exhaust duct 500 that is to be fed back into the intake duct 444. When the EGR control valve 442 is actuated, a portion of the exhaust gases flowing in the exhaust duct 500 will flow through ducts 402 and 404 (as indicated by an arrow 404) into the air duct 444 wherein the exhaust gases will become mixed with the intake air flowing from the air filter 422 to the intake manifold 412. The injection of such recirculated exhaust gases into the intake air tends to lower the combustion temperatures within the combustion cylinders 414A–414D and the formation of $NO_X$ in the combustion chambers 414A–414D can be reduced. The formation of $NO_X$ can be further reduced by electronically controlling the timing and delivery of the injection of diesel fuel into the engine's cylinders 414A–414D. In this regard, the fuel injection can be retarded to delay the beginning of combustion within each cylinder 414A–414D or rate shaping of the fuel delivery can be used.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters patent of the United States is:

1. A combustion air management and emission control system for an internal combustion engine to limit pollutants in exhaust gases emitted from an exhaust of said engine wherein said engine has multiple pistons, each of which pistons moves within a combustion cylinder of a combustion chamber; has a combustion cycle wherein each of said pistons moves within one of said combustion cylinders between a top dead center position and a bottom dead center position; and has an exhaust valve for said cylinder, said combustion air management and emission control system comprising:

a source of supplemental oxygen-enriched air; and an injection device to inject said supplemental oxygen-enriched air directly into said combustion chamber of said engine during said combustion cycle between the time that said piston is in said top dead center position and the time when said exhaust valve is opened.

2. A combustion air management and emission control system as set forth in claim 1 wherein said source of oxygen-enriched air is a selectively permeable membrane for producing oxygen-enriched air that is injected into the said combustion chamber.

3. A combustion air management and emission control system as set forth in claim 2 wherein said membrane produces oxygen-enriched air containing about 23%–35% oxygen concentration by volume.

4. A combustion air management and emission control system as set forth in claim 1 including a pressurizing device to pressurize said supplemental air being injected into said combustion chamber.

5. A combustion air management and emission control system as set forth in claim 1 including an exhaust gas recirculating mechanism for diverting a portion of said exhaust gases into an air intake of said engine.

6. A method of reducing the amount of total particulates in gases being emitted from an exhaust of an internal combustion engine having multiple pistons, each of which pistons moves within a combustion cylinder of a combustion chamber; having a combustion cycle wherein each of said pistons moves within a combustion cylinder between a top dead center position and a bottom dead center position; having an exhaust valve for said cylinder; and having a fuel injector to inject fuel into said cylinder, said method comprising injecting supplemental air through said fuel injector into the combustion chamber of said engine during said combustion cycle between the time that said piston is in said top dead center position and the time when said exhaust valve is opened.

7. A method as set forth in claim 6 wherein said supplemental air includes oxygen-enriched air supplied by a selectively permeable membrane.

8. A method as set forth in claim 7 wherein said oxygen-enriched air being supplied to said combustion chamber contains approximately 23%–35% oxygen concentration by volume.

9. A method as set forth in claim 8 wherein nitrogen-enriched air is produced by said selectively permeable membrane and at least a portion of said nitrogen-enriched air is supplied to an intake of said engine along with air being supplied to said intake.

10. A method as set forth in claim 6 wherein said supplemental air is pressurized to an elevated pressure greater than the pressure within said cylinder prior to being injected into said combustion chamber.

11. A method as set forth in claim 6 wherein the injection of fuel into said combustion chamber is retarded to delay the beginning of combustion in each of said combustion chambers of said engine.

12. A method of reducing the amount of particulates in gases being emitted from an exhaust of a diesel engine having multiple pistons, each of which pistons moves within a combustion cylinder of a combustion chamber; having a combustion cycle wherein each of said pistons moves within a combustion cylinder between top dead center and bottom dead center positions; having an exhaust valve to exhaust said cylinder; and having a fuel injector to inject fuel into said cylinder, said method comprising:

producing oxygen-enriched air by processing air through a selectively permeable membrane; and introducing said oxygen-enriched air from said membrane into the combustion chamber of said engine through said fuel injector during said combustion cycle between the time that said piston is in said top dead center position and the time when said exhaust valve is opened.

13. A method as set forth in claim 12 wherein nitrogen-enriched air is produced by said selectively permeable membrane and at least a portion of said nitrogen-enriched air is supplied to an intake of said engine along with ambient air.

14. A method as set forth in claim 12 wherein said oxygen-enriched air being supplied to said combustion chamber contains approximately 23%–35% oxygen concentration by volume.

15. A method as set forth in claim 12 wherein said oxygen-enriched air is pressurized to an elevated pressure greater than the pressure within said cylinder prior to being injected into said combustion chamber.

* * * * *